UNITED STATES PATENT OFFICE.

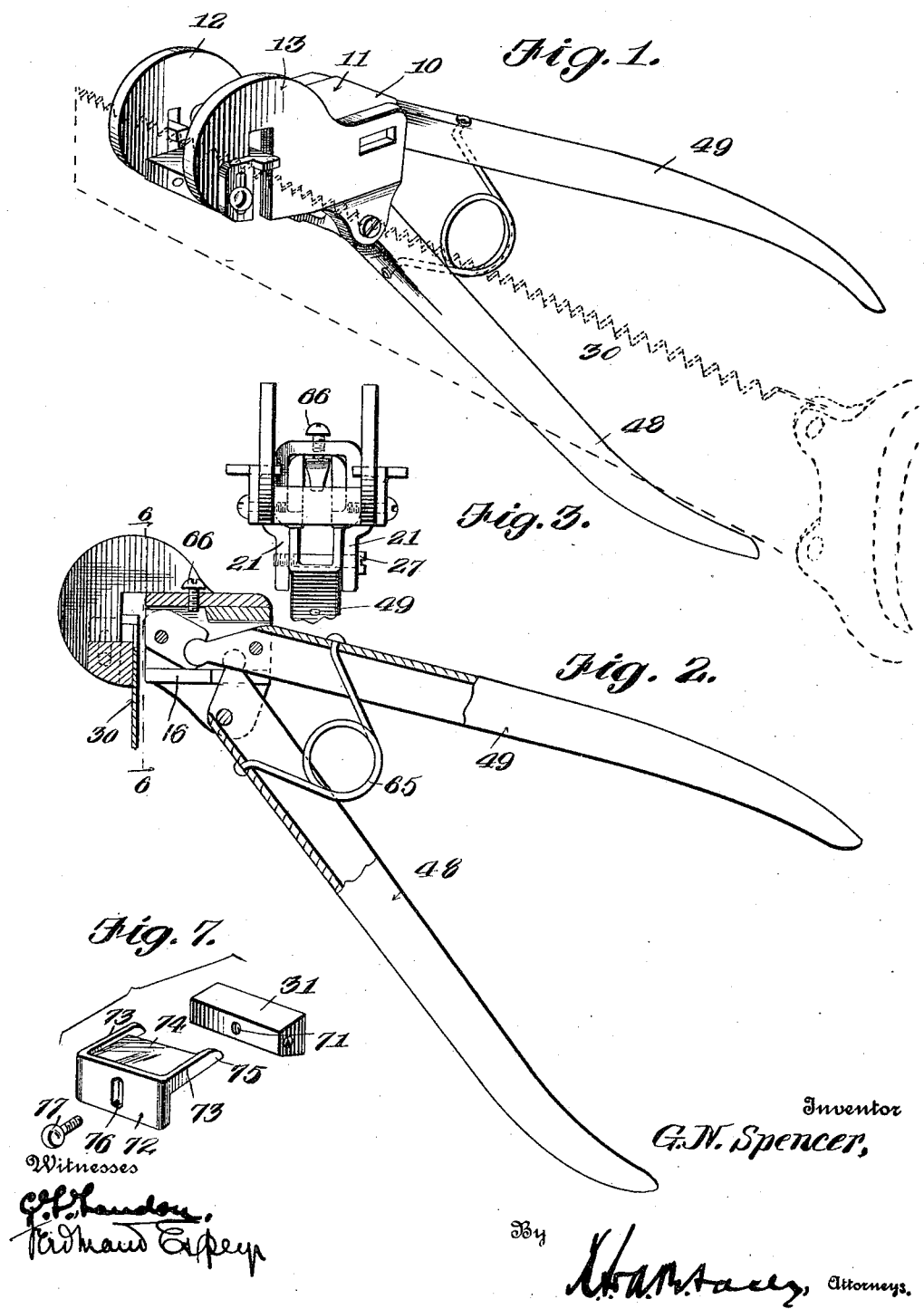
G. N. SPENCER.
SAW SET.
APPLICATION FILED NOV. 11, 1913.
1,132,694.
Patented Mar. 23, 1915.
2 SHEETS—SHEET 1.
Inventor
G. N. Spencer,

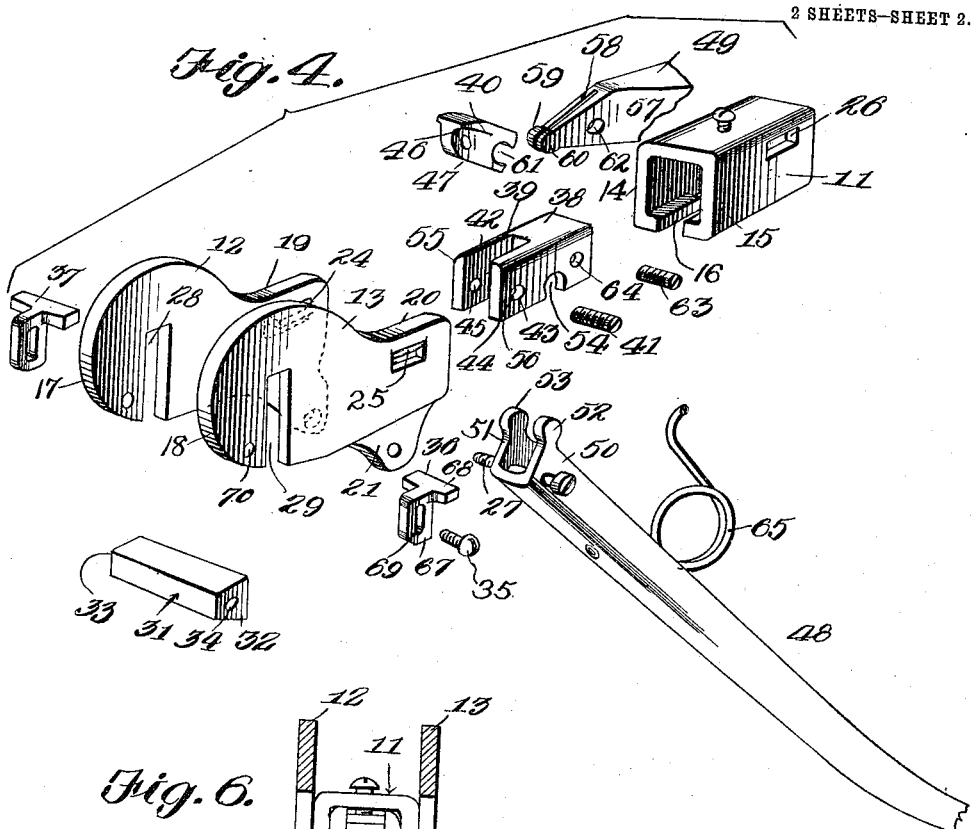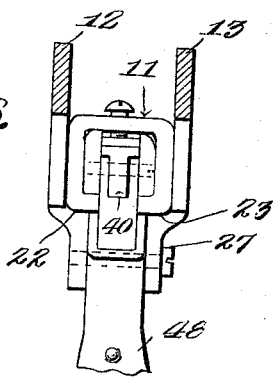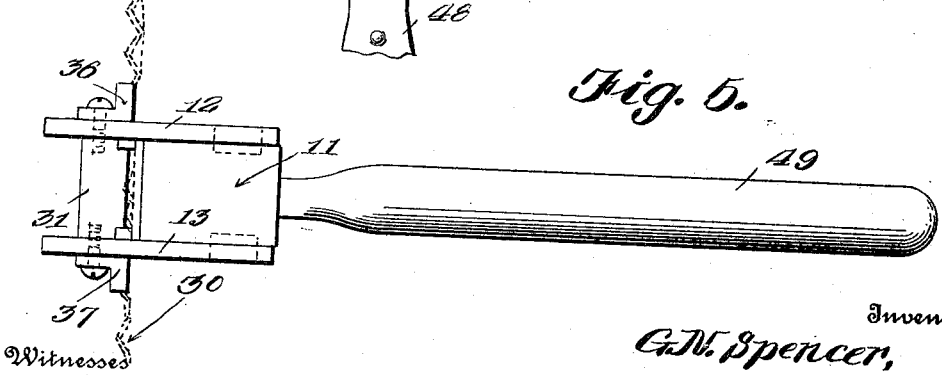

GEORGE N. SPENCER, OF FOREST GROVE, OREGON.

SAW-SET.

1,132,694.  Specification of Letters Patent.  Patented Mar. 23, 1915.

Application filed November 11, 1913. Serial No. 800,293.

*To all whom it may concern:*

Be it known that I, GEORGE N. SPENCER, a citizen of the United States, residing at Forest Grove, in the county of Washington and State of Oregon, have invented certain new and useful Improvements in Saw-Sets, of which the following is a specification.

The subject-matter of the present invention is directed to new and useful improvements in saw-sets, and aims particularly to provide a tool of this character equipped with a stationary anvil and a pair of co-acting jaws which serve to clamp the saw blade against the anvil and to bend the saw teeth to produce the desired set.

A further object is to connect the clamping jaw and the setting jaw to a pair of pivoted operating levers which are so arranged that when pressed together in the well known manner they will act to first move the clamping jaw into operative position and to then move the setting jaw against the teeth of the saw blade.

A yet further object of this invention is to equip the head of the tool with a novel form of saw stop which is adjustably mounted and may be readily positioned to limit the movement of the blade through the tool head, whereby a saw tooth of any desired length within a reasonable range may be operated upon.

An additional object is to mount the clamping and setting jaws respectively for sliding and rotating movement so that the entire face of the clamping jaw will exert a uniform pressure against the saw blade throughout its area, while the setting jaw will exert a gradually increasing pressure against the saw teeth.

This invention aims still further to provide a simple but efficient means for limiting the swinging movement of the setting jaw, thus making it possible to vary the angle to which the teeth are bent.

An object of equal importance with the foregoing is to construct the saw set of this invention with such regard to number, proportion and arrangement of parts that it may be cheaply manufactured, will be durable and efficient in its action, and may be readily and conveniently applied to the saw blade.

The above and additional objects are accomplished by such means as are illustrated in the accompanying drawings, described in the following specification and then more particularly pointed out in the claims which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a perspective view illustrating the tool with the various elements in operative assembled relation. In this figure a blade is indicated in dotted lines to disclose the manner in which the blade is inserted in the tool head when it is desired to set the teeth; Fig. 2 is a longitudinal sectional view taken through the tool head in the line of the jaw operating levers or handles; Fig. 3 is a front elevation of the tool head; Fig. 4 is a perspective view illustrating in detail the various elements of the tool in disassembled relation; Fig. 5 is a top plan view; Fig. 6 is a section on the line 6—6 of Fig. 2; and Fig. 7 is a detail perspective view illustrating a modified form of saw stop or gage and the particular form of anvil with which it is employed.

Taking up now the description of the drawings, this invention in its preferred embodiment consists broadly in a head member in which are mounted an anvil, a clamping jaw, a setting jaw, and a pair of pivoted operating levers which are respectively connected to the clamping jaw and setting jaw.

The tool head, designated as an entirety by the numeral 10, consists essentially in a substantially rectangular housing or body portion 11 and a pair of head plates 12 and 13. This housing 11 and head plates 12 and 13 are best illustrated in Fig. 4, and reference will, therefore, now be had particularly to that figure. As shown, the housing or body portion 11 is substantially rectangular in shape and is formed in the nature of a three-sided casing, being unprovided with a bottom wall so that the terminals of the operating levers may be extended into the housing. The lower edges of the side walls 14 and 15 of the housing 11 are, however, equipped with integrally formed flanges or ledges 16. These flanges 16 extend inwardly from the lower edge of the side walls 14 and 15 and are in length approximately equal to one-half the length of the side walls, as will be readily observed upon reference to Fig. 4. These flanges 16 are designed to support the clamping jaw, which, as will be hereinafter more fully described, is mounted for sliding movement through the housing 11. The purpose for which the flanges 16 are terminated at a point approximately midway of the side walls 14 and 15 will be hereinafter more fully explained during the description of the movement of the operating levers.

As above set forth, the casing or body portion 11 of the tool head carries a pair of head plates 12 and 13 which are substantially similar in construction. The head plates are each formed from a metallic plate on one end of which is formed a rounded extension or head, as indicated at 17 and 18. The main body portions of the head plates 12 and 13, which are indicated at 19 and 20, are equipped at their lower edges and adjacent their rear terminals with an apertured ear or lug as indicated at 21. These lugs 21 are at their junction with the lower edge of the members 19 and 20 bent inwardly to produce the shoulders 22 and 23 which are most clearly discernible in Fig. 6. These shoulders 22 and 23 are adapted to receive the lower edge of the side walls 14 and 15 of the housing 11.

In holding the head plates 12 and 13 in assembled relation to the housing 11, this invention employs a pair of lugs or tongues 24 and 25 which are formed in the body portion of the head plates by stamping the material of these members inwardly, as will be understood upon reference to Fig. 4. These tongues or lugs 24 and 25 are, when the head plates are applied to the housing 11, inserted in elongated slots 26 which, as illustrated in Fig. 4, are formed in the side walls 14 and 15 of the housing 11 adjacent their rear terminals. As a further means for holding the head plates 12 and 13 in the desired position against the side walls of the casing 11, a bolt 27 is inserted through the apertured ears or lugs 21 of the members 19 and 20. This bolt 27 also serves as the pivot pin for the operating lever which controls the clamping jaw, as will be hereinafter more fully explained. The rounded extensions or heads 17 and 18 of the head plates 12 and 13 are slotted, as indicated at 28 and 29. These slots are transversely alined and extend upwardly approximately two-thirds the height of the members 17 and 18. These slots receive a jaw blade which is conventionally illustrated at 30.

An anvil, the preferred form of which is illustrated at 31 in Fig. 4, is mounted between the heads 17 and 18 and is positioned with its working face extending to an approximate central point in the slots 28 and 29, as may be clearly seen upon reference to either Figs. 3 or 5. In its preferred form, the anvil 31 is formed from a rectangular bar of any suitable metal, such as tempered steel, the terminals of which bar, indicated at 32 and 33, are provided with threaded apertures 34 into which screws 35 are threaded for holding the body of the anvil in the desired assembled position. These anvil securing screws 35 are also employed in holding the saw stops 36 and 37 in the necessary adjusted position.

The manner in which the saw stops 36 and 37 are adjusted, and the manner in which the screws 35 are applied to the tool in holding the saw stops and the anvil in position will be fully described in that part of the specification devoted to the description of the operation of the tool.

In assembling the tool, the plates 12 and 13 are first secured to the housing 11 in the manner heretofore described, and the anvil 31 is next positioned between the heads 17 and 18. The next step in the assembling of the parts is to insert the clamping jaw in the casing 11. This clamping jaw, which is indicated in Fig. 4 as an entirety by the numeral 38, is formed from a tempered steel plate which is bent to produce a U-shaped conformation. The member 38 is of such size that it may be free to slide within the housing 11 and will be completely inclosed by this housing when it is disposed in inoperative position. The bight portion of the U-shaped plate from which the clamping jaw 38 is formed is bifurcated to produce a slot 39 extending from the forward end of the jaw to a point approximately midway the length thereof. This slot or bifurcation 39 is necessary in order to permit the bending or setting jaw, which will be hereinafter designated by the numeral 40, to swing on its pivot pin 41 without engaging against the bight portion of the clamping jaw.

As will be apparent when reference is had to the drawings, the setting jaw 40 is mounted for swinging or pivotal movement between the side walls 42 and 43 of the clamping jaw, being, as above indicated, mounted on a pivot pin 41. This pivot pin 41 is inserted through an aperture 44 formed in the side wall 43 adjacent its forward terminal and is threaded into a bore 45 which is formed in the side wall 42 in transverse alinement with the aperture 44. The setting jaw 40 is formed preferably of tempered steel. The forward edge of the setting jaw is cut-away to produce a bearing face or edge 46 which, as best illustrated in Fig. 6, extends at an angle to the lower edge 47 of the jaw. This angular edge portion 46 of the jaw is disposed in the plane of the rear edges of the slots 28 and 29 when the setting lever is in inoperative position, as disclosed in Fig. 2. It will thus be seen that when the rear terminal of the setting jaw 40 is swung upwardly, the angular edge or bearing face 46 will be swung so that it will extend at an acute angle to the saw blade 30. After the setting jaw 40 has been pivotally mounted in the clamping jaw 38 and this latter member has been slidably mounted in the housing 11, the operating levers 48 and 49 are respectively connected to the clamping jaw and the setting jaw.

The clamping lever 48 is formed from a channel-shaped metallic bar, the side walls 50 and 51 of which carry at their pivoted terminals a pair of rounded lugs 52 and 53. The clamping lever 48 is, as previously stated, pivotally mounted on the bolt 27 which is also employed in holding the headplates 12 and 13 in assembled position. The lugs 52 and 53 of the clamping lever are disposed in recesses 54 which are formed in the lower edges of the side walls 42 and 43 of the clamping jaw adjacent the rear terminal thereof. These recesses or notches 54 correspond in shape to the lugs 52 and 53, and it will, therefore, be obvious, particularly upon reference to the dotted lines of Fig. 2, that the lugs 52 and 53 can be withdrawn from the receiving notches 54 only by removing the operating lever 48 transversely with respect to the longitudinal axis of the clamping jaw. Inasmuch as such movement is impossible when the clamping lever 48 is pivoted between the lugs 21, it is obvious that while the clamping jaw and clamping lever are freely connected, there is no liability of accidental disconnection.

From the foregoing description, it will be noted that when the clamping lever 48 is swung upwardly on its pivot pin 27 the lugs 52 and 53 will rotate in the notches 54 and will, at the same time, swing forwardly through the housing 11. This forward swinging movement of the lugs will obviously slide the clamping jaw 58 along the flanges 16 and into engagement with the saw blade. The reason for which the flanges 16 are terminated at the approximate center of the side walls 14 and 15 will now become apparent, for it will be seen that this formation of the flanges is necessary to permit the required movement of the clamping lever 48. In this connection it will be apparent that the two forward edges 55 and 56 of the clamping jaw will exert a uniform pressure against the saw blade 30, clamping it firmly against the anvil 31.

The setting lever 49 is similar to the lever 48 and is formed from a channel-shaped metallic bar. The side walls 57 and 58 of the lever 49 are, however, unlike the side walls 50 and 51 of the lever 48, directed inwardly at their terminals to engage against each other as is most apparent in Fig. 4. The upper terminals of the side walls 57 and 58 are reduced at their extreme ends and carry a pair of rounded lugs 59 and 60. These lugs 59 and 60 are received within a notch 61 formed in the rear end of the setting jaw 40 and are of such dimensions that they may turn freely therein. The member 49 is, of course, provided with an aperture 62 which receives a pivot pin 63. This pivot pin 63 is inserted in registering apertures 64 which are formed in the side walls of the clamping jaw adjacent the rear terminal thereof.

In order to normally hold the setting jaw and the clamping jaw in inoperative position, a spring 65 is interposed between the operating levers 48 and 49. The manner in which this spring 65 operates to hold the setting and clamping jaws in an inoperative position will be readily appreciated when it is noted that the spreading apart of the operating levers tends to swing the lugs 52 and 53 of the clamping lever to a position in the rear of the housing 11, consequently, drawing the clamping jaw 38 within the housing and also swings the lugs 59 and 60 of the setting lever downwardly so that the rear terminal of the setting jaw is also swung downwardly and the bearing face 46 is swung upwardly.

In order to limit the swinging movement of the setting jaw 40 and to permit the operator to control the angle to which the saw teeth will be bent, there has been provided a set screw 66. This set-screw is threaded through the top portion of the housing 11, as is clearly shown in Figs. 2 and 3, and by engagement with the upper edge of the setting jaw limits the swinging movement of this member. It will be noted that by adjusting the set screw 66, the angle which the bearing face 46 of the setting jaw will bear to the plane of the anvil face and, consequently, the saw blade, may be quickly varied.

Reverting now to the description of the preferred form of saw stops, which have heretofore been designated by the numerals 36 and 37, and referring particularly to Figs. 4 and 5: As shown, the saw stops 36 and 37 are substantially identical in construction, and it is therefore, necessary to describe only one of them in detail, the member 36 being chosen in this instance. This saw stop 36 is formed from any suitable type of metal, and consists in a substantially rectangular body portion from the upper and inner corner of which extends a stop lug 68. The stop lug 68 is arranged with its longitudinal axis at right angles to both the transverse and longitudinal axes of the rectangular body member 67. It is also to be observed that the member 68 is so positioned that its terminals are disposed equidistantly from the body member 67, thus adapting the saw stop for application to either side of the tool head. The body portion 67 of the saw stop is, of course, slotted as at 69 so that the screw 35 may be inserted through the body member for holding it in position against the head plate. Relative to the manner in which the screw 35 is employed in both holding the stop member 36 in adjusted position and securing the anvil 31 between the heads 17 and 18 of the head plates 12 and 13, it will be noted upon reference to Fig. 4 particularly that the screw is first inserted through the slot 69, is then passed through an aperture 70, which is formed in the head 18 adjacent its lower terminal, and is then threaded into the bore 34 of the anvil. A similar screw is applied in a similar manner for holding the saw stop 37 and anvil terminal 33 in the proper relation to the head 17 of the head plate 12. Referring now to Fig. 1, it will be observed that when the saw blade 30 is inserted in the alined slots 28 and 29 of the tool head, the teeth of the saw will engage against the under faces of the stop lugs 68. From the foregoing description, it will be obvious that by manipulating the screw 35, the saw stops may be adjusted to dispose the stop lugs 68 in the desired position within the slots 28 and 29, and as a result the distance to which the saw blade may be moved upwardly over the face of the anvil 31 may be readily and easily controlled. The members 36 and 37 are, as previously stated, the preferred form of saw stops which are employed with the tool of this invention, but in this connection it may be well to explain that they are only adapted for use when it is desired to set the teeth of small saws, such as scroll saws and the like.

When the tool is to be applied to a rip saw for setting the teeth thereof which are relatively large, it is necessary to use a modified form of stop. Such a modification is illustrated in Fig. 7. In this modified form of anvil, a threaded bore 71 extends laterally from the rear face of the anvil, being adapted to receive an attaching screw for holding the saw stop in adjusted position, as will be hereinafter explained. The body portion 72 of the modified stop is substantially rectangular in shape, being formed from any suitable metal and carries at its upper edge and at each terminal thereof an arcuate arm 73. These arms 73 are adapted to receive a plate of glass, indicated at 74. This glass plate is provided in order that the operator may observe the action of the setting and clamping jaws when the tool has been applied to the saw blade. The extreme terminals of the arcuate arms 73 extend, as indicated at 75, beyond the inner edge of the glass plate and serve to limit the upward movement of the saw blades through the slots 28 and 29 in the same manner as do the stop lugs 68 of the members 36 and 37. The terminals of the glass plate 74 may be seated in the grooves formed in inner faces of the arms 73 or may be secured in any other desired and suitable manner. As a means for permitting the stops 75 to be vertically adjusted within the tool head, the body portion 72 has been formed with an elongated slot, indicated in Fig. 7 by the numeral 76. This slot 76 receives an attaching screw 77 which, being threaded into the member 71, serves to hold the body portion 72 of the stop in the desired position.

The actual construction and arrangement of the various parts of the tool being thus described it now remains to explain the operation of the several elements during the application to a saw blade. Briefly the operation is as follows: The saw blade 30 is inserted in the slots 28 and 29 and disposed with its one side bearing against the adjacent inner face of the anvil 31. The operator then grasps the operating levers 48 and 49 and squeezes them together against the tension of the spring 65. Inasmuch as the spring 65 is so arranged that the round lugs 52 and 53 of the clamping lever will swing forwardly in advance of the upward swinging movement of the lugs 59 and 60 of the setting lever, it is obvious that the clamping jaw 38 and setting jaw 40 will be successively moved into engagement with the saw blade in the order named. It is thus seen that the clamping jaw slides forwardly through the housing 11 to clamp the saw blade 30 firmly against the handle, and that immediately following this movement of the clamping jaw, the bearing face 46 of the setting jaw presses against the adjacent saw tooth and bends it toward the anvil, thus producing the desired set.

It is desirable to again emphasize the fact that by adjusting the screw 66, the angle to which the saw teeth are bent may be readily varied. After the alternate teeth of the saw blade have been bent in one direction, it only remains to withdraw the blade from the slots 28 and 29, and to reverse its position therein, so that the remaining teeth may be bent in the opposite direction by the setting jaw.

In concluding the description of this invention, attention is directed to the fact that the tool is constructed with all due regard to simplicity in the construction of the parts so that the device may be cheaply manufactured, will be durable and efficient in service, and being constructed of a relatively small number of parts will not be liable to breakage as are many of the devices of this type which are more complicated in their conformation.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

Having thus described the invention, what is claimed as new is:

1. In a device of the character described, a head member consisting in a housing and a pair of separate head plates removably carried thereby, an anvil removably mounted therein, a clamping jaw slidably mounted in the head member and movable transversely with respect to the anvil, a setting jaw pivotally mounted in the clamping jaw, adjustable means carried by the head member for limiting the swinging movement of the setting jaw by engagement therewith, and a pair of operating levers connected to the clamping and setting jaws and adapted to successively move the jaws into operative engagement against a saw blade.

2. In a device of the character described, a head member including a housing, a pair of head plates removably secured thereto, said housing being open at its lower portion, inwardly directed flanges formed at the lower edges of the housing, a clamping jaw slidably mounted on the said flanges, a setting jaw pivotally mounted in the clamping jaw, adjustable means carried by the housing for limiting the swinging movement of the setting jaw by engagement therewith, and a pair of coacting operating levers connected to the clamping and setting jaws.

3. In a device of the character described, a head member consisting in a substantially rectangular housing having a pair of spaced parallel side walls and a connecting top wall, a pair of detachable head plates carried by the side walls of the housing, the terminals of the head plates projecting beyond the housing and having slots adapted to receive a saw blade, a removable anvil mounted between the projecting terminals of the head plates, a clamping jaw slidable in the housing, said housing having inwardly directed flanges supporting the clamping jaw, a setting jaw pivoted in the clamping jaw, and co-acting levers operatively connected to the clamping and setting jaws.

4. In a device of the character described, a head member, said head member including a housing and a pair of removable head plates carried thereby, said housing being substantially U-shaped in cross section and having inwardly directed flanges formed on the lower edges of its side walls, an anvil removably mounted between the head plates and spaced from the housing, a clamping jaw arranged in the housing, said clamping jaw being substantially U-shaped in cross section and having the lower edges of its side walls arranged for sliding movement on the flanges of the said housing, there being notches formed in the lower edges of the side walls of the clamping jaw, a setting jaw pivoted between the side walls of the clamping jaw and having an angular bearing face, a pair of co-acting levers, one of which is operatively connected to the setting jaw and the other of which is operatively connected to the clamping jaw, the last-mentioned lever being provided with terminal lugs adapted to freely seat in the said notches of the clamping jaw.

5. In a device of the character described, a head member, said head member including a housing and a pair of detachable head plates carried thereby, an anvil removably mounted between the head plates and spaced from the housing, a clamping jaw slidably mounted in the housing, a setting jaw pivoted in the clamping jaw, co-acting levers operatively connected to and controlling movement of the clamping and setting jaws, and a stop member for limiting the distance which the saw blade may be projected into the head member, said saw stop being detachably secured to the said anvil and having stop arms extending inwardly and laterally therefrom.

6. In a device of the character described, a head member including a housing and a pair of head plates, said head plates being provided with transversely alined slots adapted to permit the insertion of a saw blade in the head member, a clamping jaw slidable through the housing, a setting jaw pivoted in the clamping jaw, co-acting levers operatively connected to the clamping and setting jaws, a stop member for limiting the distance which the saw blade may be projected into the side walls, said stop member including a body plate, means for detachably securing the body plate to the outer face of the anvil, a pair of parallel arms extending from the body plate transversely across the upper face of the anvil and inwardly into the head member, and a glass plate mounted between the said arms and extending inwardly beyond the anvil.

In testimony whereof I affix my signature in presence of two witnesses.

GEORGE N. SPENCER. [L. S.]

Witnesses.
J. A. THORNBURGH,
M. E. LITTLEHALES.

Copies of this patent may be obtained for five cents each, by addressing the "Commissioner of Patents, Washington, D. C."